(12) United States Patent
Beakley et al.

(10) Patent No.: US 7,317,266 B2
(45) Date of Patent: Jan. 8, 2008

(54) ANTI-COGGING METHOD AND APPARATUS FOR A LINEAR MOTOR

(75) Inventors: Bruce Beakley, Houston, TX (US); James J. Marsh, Friendswood, TX (US); Robert T. Shaul, LaPorte, TX (US); Brian L. Juhasz, Friendswood, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 11/075,537

(22) Filed: Mar. 9, 2005

(65) Prior Publication Data

US 2005/0236912 A1  Oct. 27, 2005

Related U.S. Application Data

(60) Provisional application No. 60/554,089, filed on Mar. 17, 2004.

(51) Int. Cl.
*H02K 41/00* (2006.01)

(52) U.S. Cl. .......................... 310/12; 310/13

(58) Field of Classification Search ............... 310/112, 310/113, 114, 12–13, 14
See application file for complete search history.

(56) References Cited

U.S. PATENT DOCUMENTS

| | | | | |
|---|---|---|---|---|
| 4,638,192 A * | 1/1987 | von der Heide | ............... | 310/12 |
| 4,912,746 A * | 3/1990 | Oishi | ............... | 310/12 |
| 5,723,917 A * | 3/1998 | Chitayat | ............... | 310/12 |
| 5,744,879 A * | 4/1998 | Stoiber | ............... | 310/12 |
| 6,064,128 A * | 5/2000 | Yagoto et al. | ............... | 310/12 |
| 6,570,273 B2 * | 5/2003 | Hazelton | ............... | 310/12 |
| 6,791,214 B2 * | 9/2004 | Korenaga | ............... | 310/12 |
| 7,091,679 B2 * | 8/2006 | Schroeder et al. | ............... | 318/135 |
| 2003/0230940 A1 * | 12/2003 | Miyashita et al. | ............... | 310/12 |
| 2004/0217659 A1 * | 11/2004 | Godkin | ............... | 310/12 |
| 2004/0239194 A1 * | 12/2004 | Thirunarayan et al. | ............... | 310/12 |
| 2005/0029877 A1 * | 2/2005 | Harned et al. | ............... | 310/12 |

* cited by examiner

*Primary Examiner*—Thanh Lam
(74) *Attorney, Agent, or Firm*—Patrick Stellitano

(57) ABSTRACT

The present invention provides a method for reducing cogging in a linear motor and for mounting sensors to determine motion of the motor.

12 Claims, 8 Drawing Sheets

ANTI-COGGING METHOD AND APPARATUS FOR A LINEAR MOTOR

PRIORITY

This application claims priority of U.S. provisional patent application No. 60/554,089 filed Mar. 17, 2004 pursuant to 35 U.S.C. 119(e).

TECHNICAL FIELD OF THE INVENTION

The present invention relates to the field of linear motors and methods and apparatus for reduction of cogging.

BACKGROUND OF THE INVENTION

Linear motors are used in a variety of applications, including automated positioning systems, robotics, hard drives, semiconductor manufacturing, and electronic assembly. A description of linear motor construction and operation is provided in U.S. Pat. No. 4,839,543, issued to Trilogy Systems Corporation, which is incorporated herein by reference. A position encoder system for positioning linear motors is described in U.S. Pat. No. 6,326,908, also issued to Trilogy Systems Corporation, and also incorporated herein by reference.

Shown in FIG. 1 is an end cross-sectional view, of a conventional assembly for mounting a linear motor. Linear motor coil assembly 1500, which may be a core-less or an iron core motor assembly, is affixed to a carriage plate 1100 by way of bolts inserted into a plurality of bolt holes 1530. Carriage plate 1100 serves to conduct heat away from assembly 1500 and also serves to mount bearing block assemblies 1000 using bolts inserted into bolt holes 1110. Bearing block assemblies 1000 comprise roller bearings or ball bearings 1032 that roll against bearing rails 1030. Bearing rails 1030 are secured to a base plate 1200 by bolts inserted into a plurality of bolt holes 1041. The base plate 1200 may be secured to a fixed structure with bolts inserted into a plurality of bolt holes 1201. Also secured to base plate 1200 by bolts inserted into a plurality of bolt holes 1401 is a magnet support structure 1400, which supports a linear array of magnets 1540. Mounted to the linear motor coil assembly 1500 is a connector assembly (not shown) that enables current to be coupled to the coils of the motor. Also not shown are sensors for detecting the position of the motor as described in U.S. Pat. No. 6,326,908.

Shown in FIG. 2 is a motor core assembly 8500 positioned above a linear array of magnets. The magnets alternate in polarity between north 8541 and south 8542 poles. The magnets are disposed in a linear array upon a magnet support structure (not shown) and separated by spacers 8543. An undesirable force disturbance occurs when the ends of core assembly 8500 traverse over a transition between a north polarity magnet 8541 and a south polarity magnet 8542. The graph 8901 is roughly indicative of the rise and fall, as a function of position, of the magnitude of the force. This cyclical force undesirably acts upon core assembly 8500, a phenomenon known in the art as cogging. There is a need to reduce the cogging force because cogging undesirably interferes with the smooth and efficient transfer of power to the motor.

One prior art method for reducing cogging is to skew the coils with respect to the axis of the magnets or to skew the magnets with respect to the axis of the coils. But skewing results in a loss of motor efficiency. Another prior art method for reducing cogging is to apply shaped magnets, but this too results in loss of efficiency. Also, the manufacture of shaped magnets is more expensive than the manufacture of rectangular magnets.

Thus, there is a need for an anti-cogging method that substantially eliminates cogging, is not expensive to implement, and causes little or no efficiency loss

SUMMARY OF THE INVENTION

The present invention provides an anti-cogging method and apparatus for substantial reduction of cogging in a linear motor. The present invention can reduce cogging to practically zero, is not expensive to implement, and causes little or no efficiency loss. The present invention reduces cogging by providing a force that is equal in magnitude but opposite in direction to the cogging force to provide cancellation thereof at any motor velocity.

According to one aspect of the invention, the cancellation force is provided by shaped parts attached to the moving part of the motor. For example, a shaped block of magnetically permeable material is mounted to each end of the core of the motor. As the motor moves, each block experiences a magnetic coupling with the magnets that increases and decreases gradually as the motor moves. The parts are shaped and oriented to create a force that equals and opposes the cogging force. The method of the present invention does not sacrifice motor efficiency to achieve reduced cogging. Employing the method of the present invention, cogging can be effectively eliminated with practically no loss at all in efficiency.

According to another aspect of the invention, sensors and associated circuitry to determine motor movement are attached to a connector that is attached to the moving part of the linear motor. The connector comprises a receptacle for receiving a cable that provides electrical power to the coils of the motor. The cable also provides signal communication with a circuit board that contains the sensors.

The foregoing has outlined rather broadly aspects, features and technical advantages of the present invention in order that the detailed description of the invention that follows may be better understood. Additional aspects, features and advantages of the invention will be described hereinafter. It should be appreciated by those skilled in the art that the disclosure provided herein may be readily utilized as a basis for modifying or designing other structures for carrying out the same purposes of the present invention. Persons of skill in the art will realize that such equivalent constructions do not depart from the spirit and scope of the invention as set forth in the appended claims, and that not all objects attainable by the present invention need be attained in each and every embodiment that falls within the scope of the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
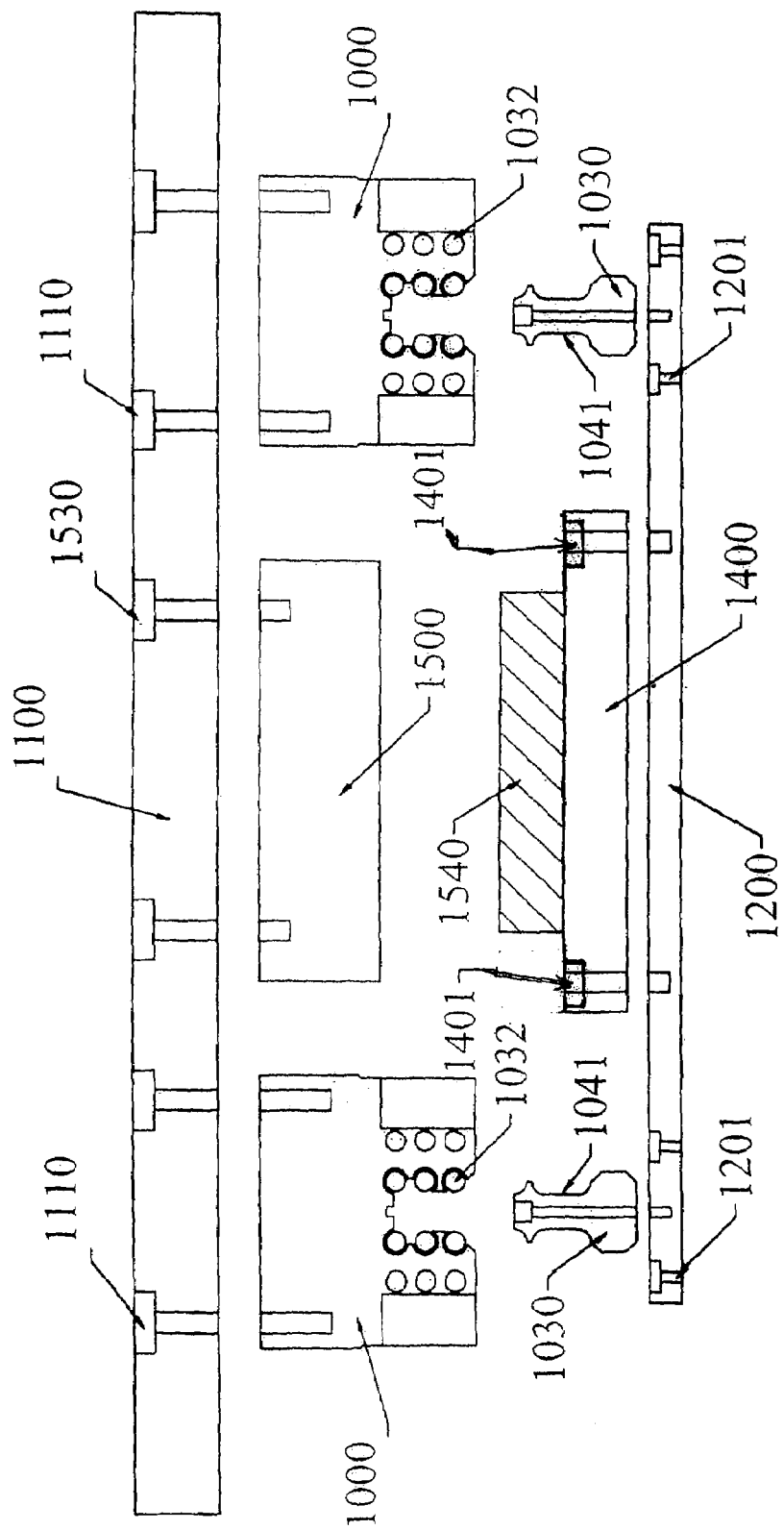
FIG. 1 is a front cross-sectional view of a conventional method for mounting a linear motor.
Figure 2:
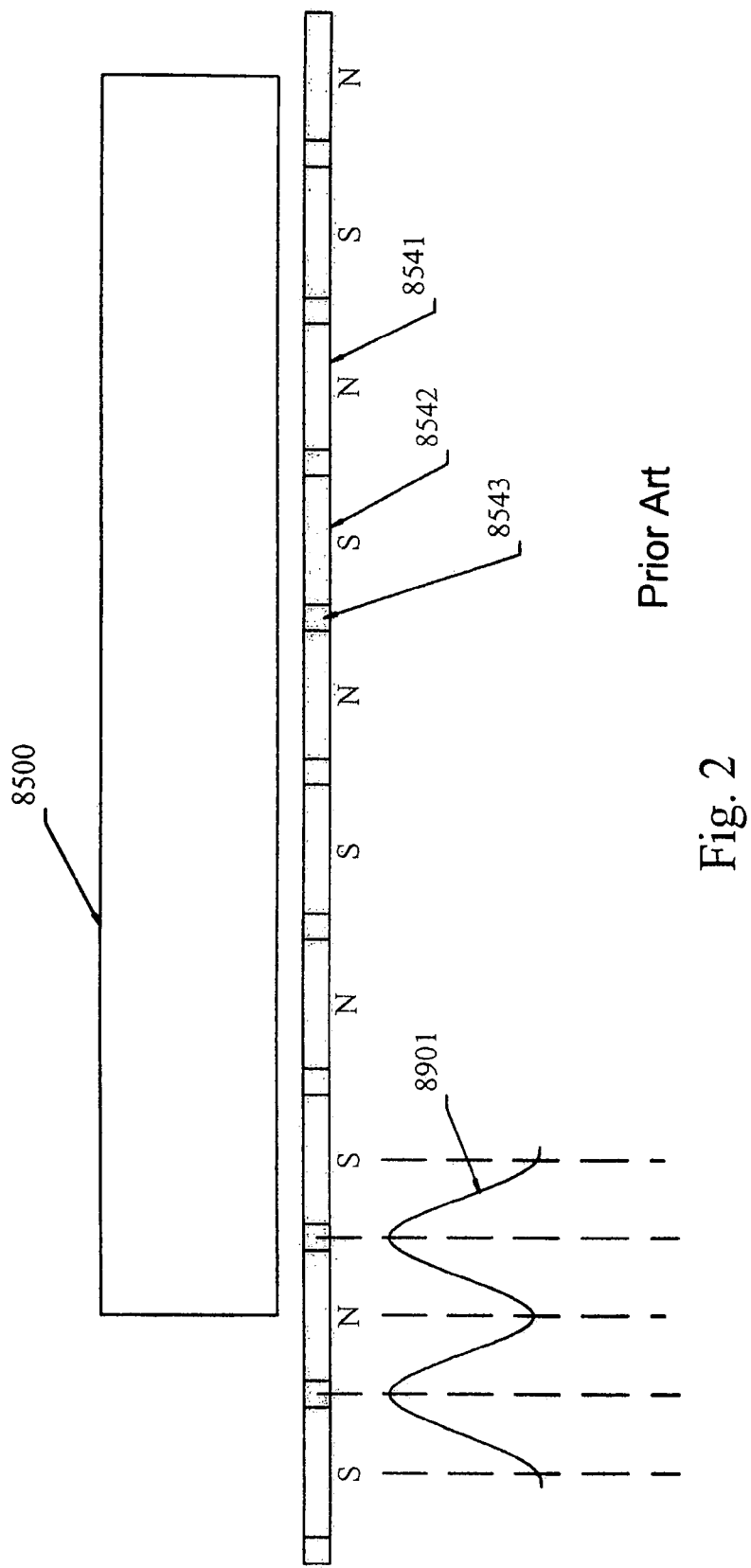
FIG. 2 is a simplified side view of a conventional linear motor configuration.
Figure 3:
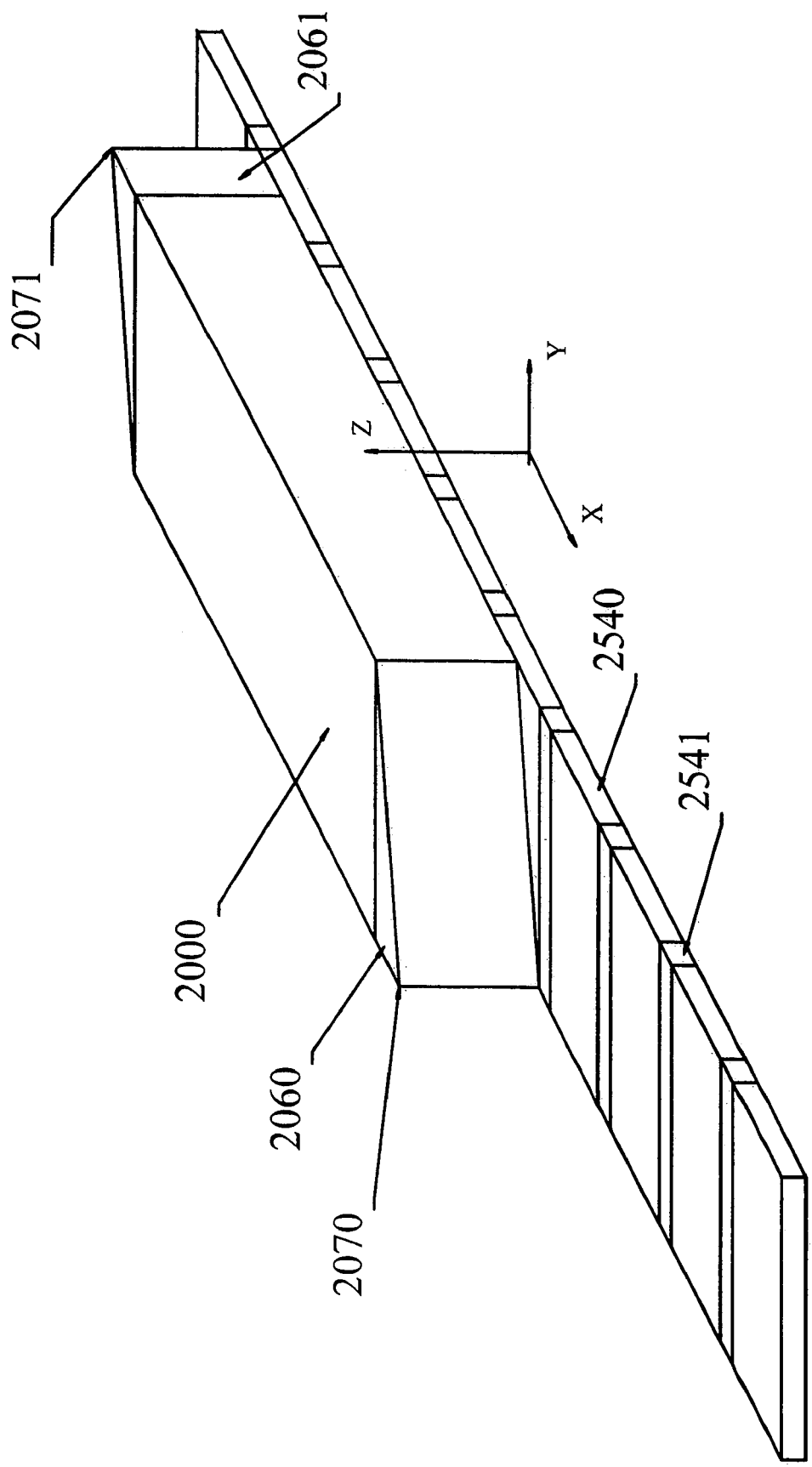
FIG. 3 is a simplified perspective view of an embodiment of the present invention.

An embodiment of the present invention is illustrated in the simplified drawing of FIG. 3. A shaped block of permeable material 2060 at an end of motor core assembly 2000 is provided. Also, a shaped block of permeable material 2061 at the opposite end of motor core assembly 2000 is provided. Each shaped block 2060 and 2061 is mounted to move with the motor. As the motor moves along the track of magnets 2540 in track 2200, the vertex 2070 of block 2060 extends into the space above a magnet, and the volume density of permeable material directly above the magnet gradually changes as the motor moves. Similarly, vertex 2071 of block 2061 extends into the space above a magnet, and the volume density of permeable material directly above the magnet gradually changes as the motor moves. As the volume density of permeable material in the space above a magnet gradually increases or decreases, the strength of magnetic coupling between the magnet and the block gradually increases or decreases, respectively. The parts are shaped and oriented to create a force due to the coupling between the parts and the magnets that equals and opposes the cogging force.

Figure 4:
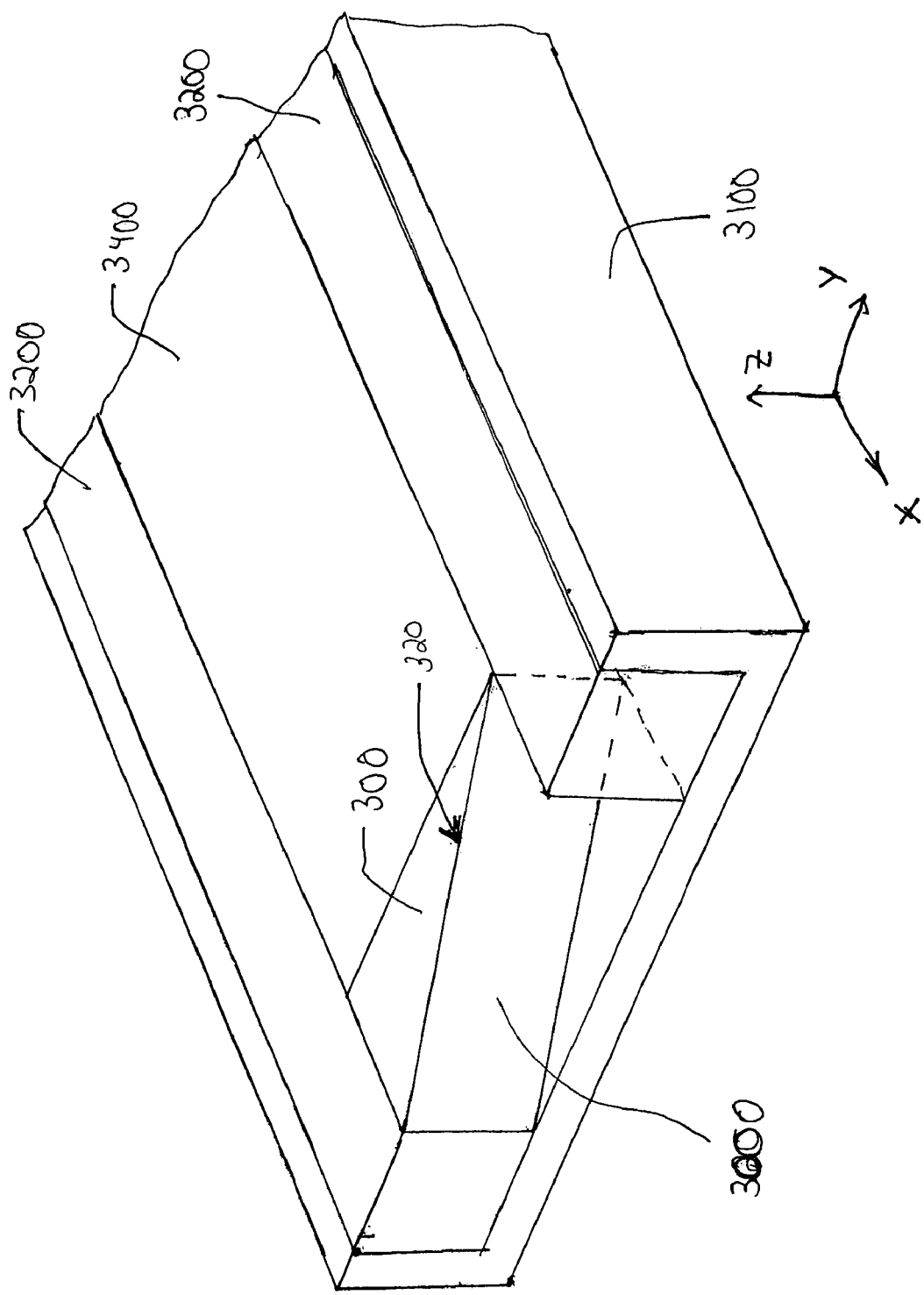
FIG. 4 is a bottom perspective view of an embodiment of the present invention.

FIG. 4 shows a bottom view of an embodiment of a shaped block 3000 mounted to move with an iron core coil assembly 3400. Shaped block 3000 exhibits a tapered side 320 and a flat surface 300. On either side of coil lamination assembly 3400 is epoxy encapsulation 3200 as might be employed by one of ordinary skill in the art. Coil assembly 3400 and encapsulation 3200 are in the aluminum assembly tray 3100. Block 3000 is preferably integrally cut or formed from a unitary block of permeable material such as soft magnetic composite material. Shaped surface 320 causes a gradual increase or decrease in the volume density of material directly above a magnet.

Figure 5:
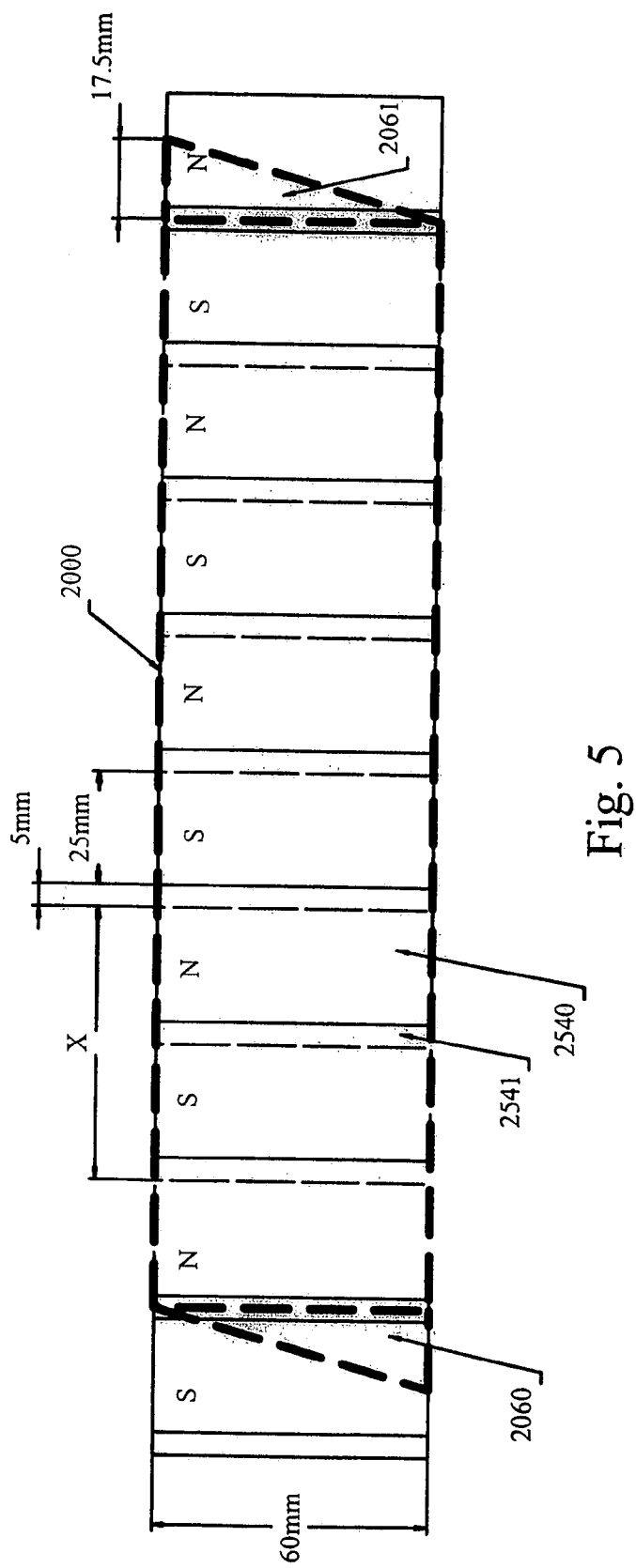
FIG. 5 shows the position and dimensions of shaped blocks relative to that of the magnets for anti-cogging.
Figure 6:
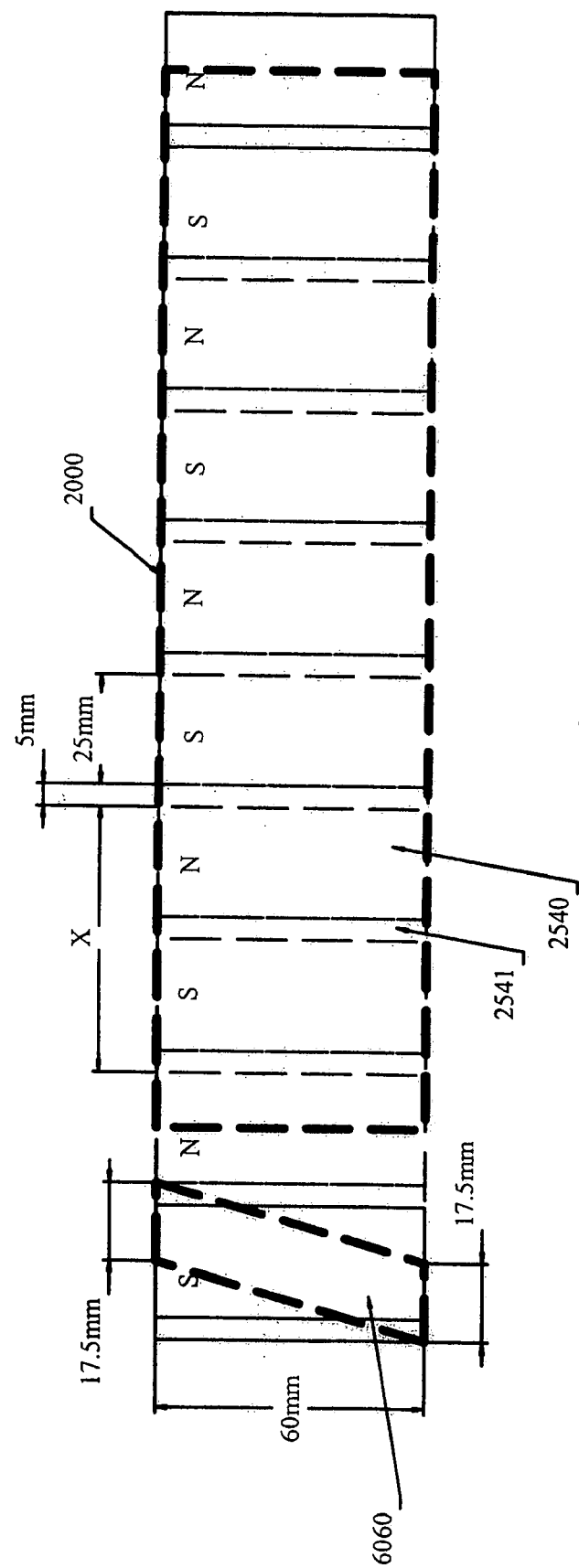
FIG. 6 shows an alternative configuration for anti-cogging.

FIG. 5 schematically shows a parallelogram formed by the two shaped blocks 2060 and 2061 placed at each end of iron core motor 2000 above an array of magnets 2540 separated by spacers 2541. For the nominal dimensions shown, with a magnet width of 25 milli-meters (mm) and 5 mm wide spacers, the width of a complete cycle, X, is 60 mm. The shaped blocks 2060 and 2061 each exhibit a width of 17.5 mm, which is 7/24 of a cycle. They exhibit a length equal to the 60 mm length of the magnets. When these blocks are mounted as shown in FIG. 5, the force generated by their shapes and positions effectively cancels the cogging force acting on the core FIG. 6 shows an alternative configuration wherein permeable material 6060, shaped to exhibit a parallelogram, is displaced from the end of core 2000, yet mounted to move with the core. In this position the force generated by the shape and position of shaped part 6060 effectively cancels the cogging force acting on the core. Note that the parallelogram in FIG. 6 is the shape obtained from placing side to side the blocks 2060 and 2061 shown in FIG. 5.

Figure 7:
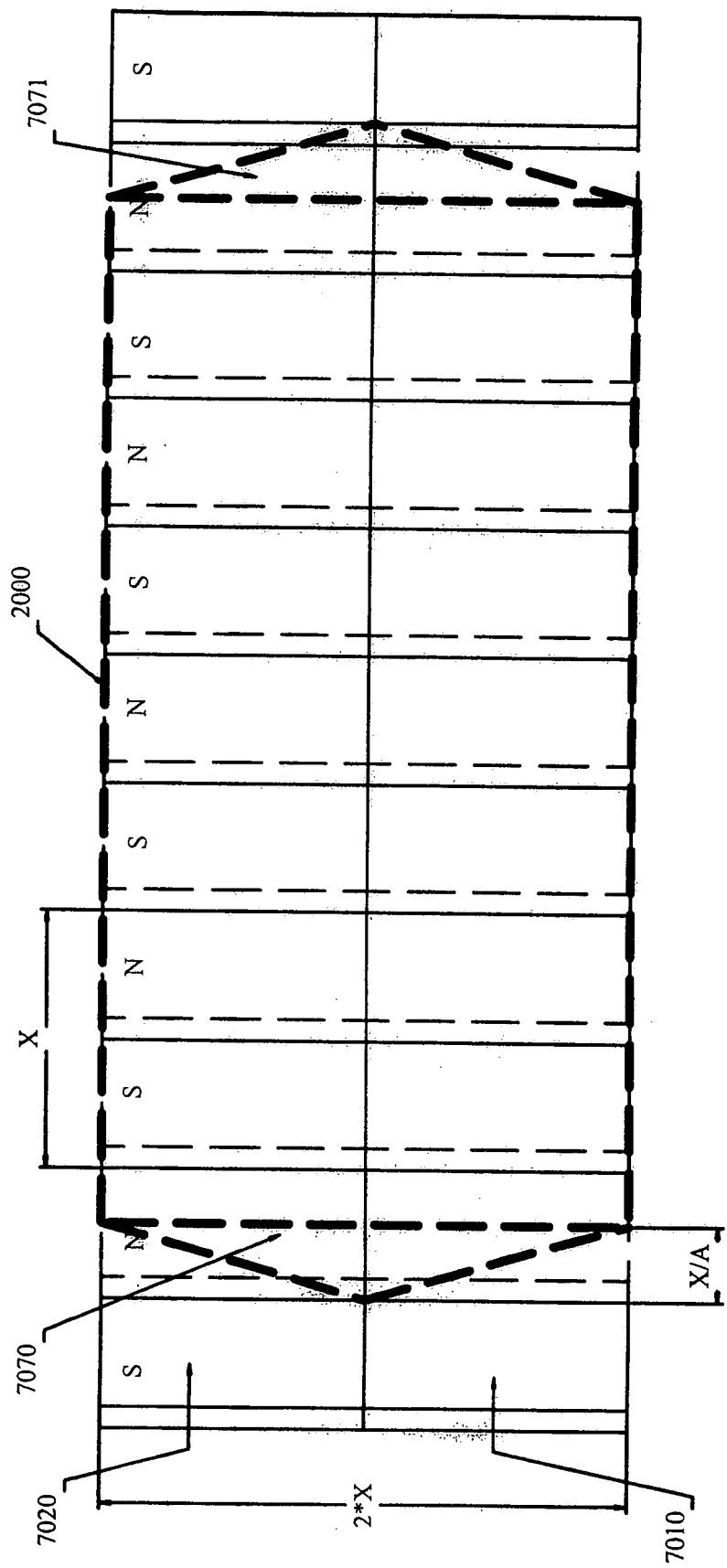
FIG. 7 shows an embodiment with two rows of magnets.

FIG. 7 shows two rows 7010 and 7020 of magnets each of length X, as is sometimes employed in the manufacture of linear motors. A shaped part 7070, mounted at one end of core 2000, and made of permeable material, exhibits a width that is a fraction, X/A, of the cycle width, X. For example, the width may be 7/24 of a cycle. An optimal fraction can be found by experimentation. Note that the triangle shape of part 7070 in FIG. 7 is the shape obtained from placing side to side the blocks 2060 and 2061 shown in FIG. 5. On the opposite end of core 2000 is a shaped part 7071, similar to part 7070. The interaction of the parts with the motor combined to produce a substantial cancellation of the cogging force.

Persons of ordinary skill in the art will find, by simple experimentation, shapes and permeability concentrations for parts to be mounted on the linear motor according to the methods of the present invention to achieve optimal reduction of cogging. Alternatively, computational methods known in the art may be employed to predict or estimate the impact upon cogging of a particular shape.

Figure 8:
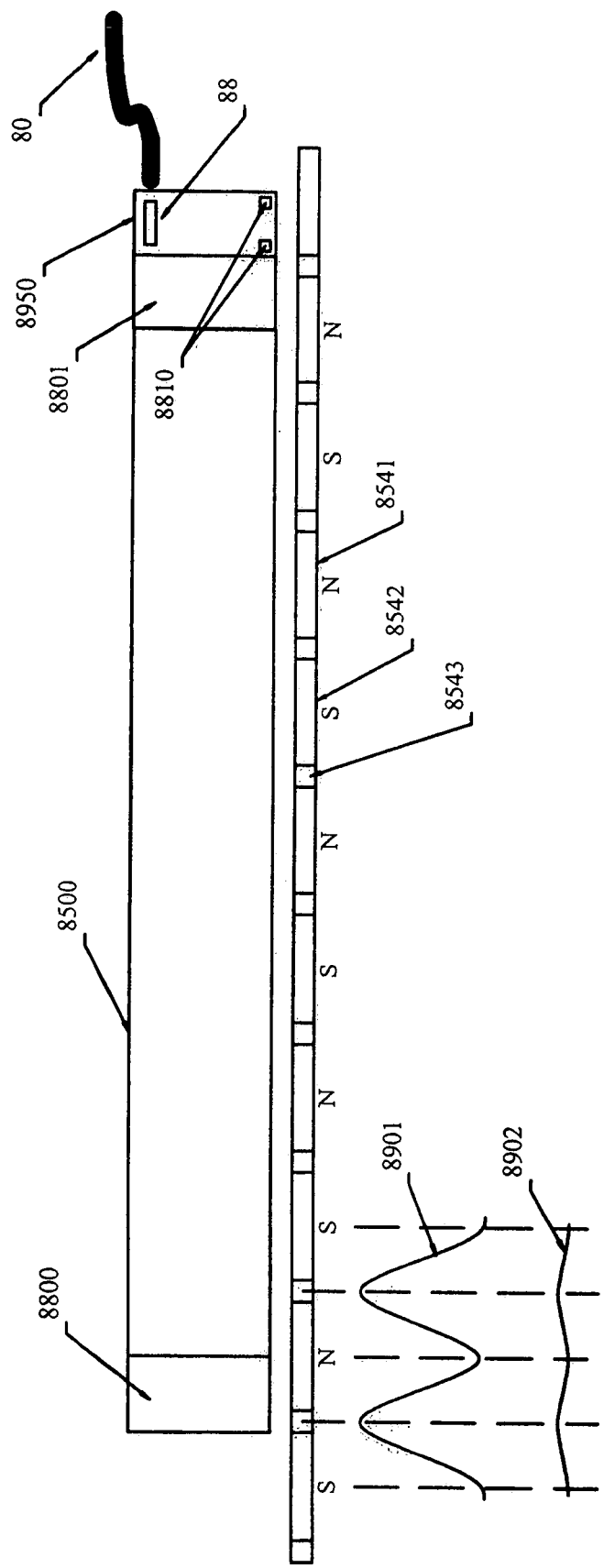
FIG. 8 is a side view of a configuration of the present invention.

FIG. 8 shows a simplified diagram of a side view of the method of the present invention. A shaped block 8800 is mounted on one end of motor coil assembly 8500 and shaped block 8801 is mounted on the opposite end. Without these parts 8800 and 8801, a cogging force occurs when the ends of core assembly 8500 traverse over a transition between a north polarity magnet 8541 and a south polarity magnet 8542. The graph 8901 is indicative of the rise and fall, as a function of position, of the magnitude of this force. This cyclical force undesirably acts upon core assembly 8500, a phenomenon known in the art as cogging.

The parts 8800 and 8801 are shaped and oriented to create a force that equals and opposes the cogging force. The resultant rise and fall of the cogging force as a function of the position of iron core assembly 8500, as indicated by the graph 8902, is substantially diminished by the introduction of parts 8800 and 8801. Indeed, cogging can be reduced to negligible levels. Note, that the method does not sacrifice motor efficiency to reduce cogging. There is no need for skewing of the magnets or coil. Electric current losses in the shaped blocks are believed to be negligible. Also, the shaped parts help dissipate heat away from the coils. Thus, employing the method of the present invention, cogging can be effectively eliminated with practically no loss at all in electrical efficiency and with a slight gain in thermal efficiency. Note also that no costly specialized shape of magnets or coils is required to implement this method. Indeed, existing linear motors can be retrofitted with parts according to the present invention to achieve anti-cogging.

The shaped blocks described above are desirably formed of soft magnetic composites. Soft magnetic composites (SMC) are insulation coated ferrous powder metal (P/M) materials that can be molded into a shape. A high-pressure compaction process can be used to mold the SMC component into a complex shape capable of producing three dimensional magnetic flux patterns. The soft magnetic composite is formed of ferromagnetic powder particles surrounded by an electrical insulating film. More specifically, SMCs may utilize high purity iron powder, the grains of which are bonded with a coating of an organic material which produces the high electrical resistivity of the compact. Electric current in the composite is minimized because of the electrical isolation between particles. Thus, electric current losses are minimized. Yet the soft magnetic composite can exhibit a high permeability.

Thus, a shaped block of soft magnetic composite material may be formed as a unitary part. Alternatively, layers of composites of different densities can be stacked to form a gradient of permeability, each layer being adhered to adjacent layers by a laminating process. Soft magnetic composites are commercially available from several sources including, for example, Burgess-Norton, http://www.burgessnorton.com. A typical SMC that is commercially available and that may be employed in the present invention is Somaloy 500.

A connection assembly 8950 may be mounted at an end coil assembly 8500. Connection assembly 8950 comprises a receptacle 88 for receiving an end connector 84 of a cable 80. Cable 80 provides electrical power to coil assembly 8500 and also provides signal communication with sensors 8810. Sensors 8810 may be, for example, Hall effect sensors or optical sensors. The signals from these sensors are amplified and processed by circuitry to determine motor position or change in motor position. The circuitry for processing motor position data may be mounted on a circuit board to which the sensors are mounted, the circuit board and sensors being mounted within or on connection assembly 8950. Alternatively, the processing circuitry may be connected to the sensors by cable 80.

Although the present invention and its advantages have been described in detail, it should be understood that various changes, substitutions and alterations can be made herein without departing from the spirit and scope of the invention as defined by the appended claims. The invention achieves multiple objectives and because the invention can be used in different applications for different purposes, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A linear motor with reduced cogging effect, comprising:
    a moving part of the motor containing coils;
    a parallelepiped-shaped permeable material part positioned away from an endmost portion of a moving core of the linear motor, and the permeable material part attached to move with the core, the parallelepiped exhibiting a base that is parallel to an axis of motion of the moving part and a side that makes an angle with the axis of motion and wherein the parallelepiped shaped permeable part is positioned away from the end of the moving core of the motor by about the width of one magnet and one spacer.

2. The linear motor of claim 1, wherein the base of the parallelepiped is about equal to one half the sum of the width of a magnet and the separation distance between adjacent magnets.

3. The linear motor of claim 1, further comprising a sensor mounted to a fixture that is mounted to move with the motor, the fixture receiving a cable to provide power to the motor and to provide signal communication with the sensor and wherein the sensor is mounted to a circuit board that is mounted to the fixture and wherein the circuit board comprises circuitry to process sensor signals to determine motor movement.

4. The linear motor of claim 1, further comprising a sensor and a circuit mounted to move with the motor, with circuitry of the circuit to process sensor signals.

5. The linear motor of claim 3, wherein the base of the parallelepiped is about equal to one half the sum of the width of a magnet and the separation distance between adjacent magnets.

6. The linear motor of claim 4, wherein the base of the parallelepiped is about equal to one half the sum of the width of a magnet and the separation distance between adjacent magnets.

7. The linear motor of claim 4, wherein the moving part has a permeable core made of the same permeable material as the permeable part.

8. The linear motor of claim 3, wherein the moving part has a permeable core made of the same permeable material as the permeable part.

9. The linear motor of claim 1, wherein the moving part has a permeable core made of the same permeable material as the permeable part.

10. The linear motor of claim 1, wherein the base of the parallelepiped exhibits a width that is about one half a cycle of the linear motor.

11. The linear motor of claim 3, wherein the base of the parallelepiped exhibits a width that is about one half a cycle of the linear motor.

12. The linear motor of claim 4, wherein the base of the parallelepiped exhibits a width that is about one half a cycle of the linear motor.

* * * * *